US010581109B2

(12) United States Patent
de Souza et al.

(10) Patent No.: US 10,581,109 B2
(45) Date of Patent: Mar. 3, 2020

(54) FABRICATION METHOD OF ALL SOLID-STATE THIN-FILM BATTERY

(71) Applicant: International Business Machines Corporation, Armonk, NY (US)

(72) Inventors: Joel P. de Souza, Putnam Valley, NY (US); Yun Seog Lee, White Plains, NY (US); Kunal Mukherjee, Goleta, CA (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/474,570

(22) Filed: Mar. 30, 2017

(65) Prior Publication Data

US 2018/0287186 A1  Oct. 4, 2018

(51) Int. Cl.
*H01M 10/04* (2006.01)
*H01M 10/0525* (2010.01)
(Continued)

(52) U.S. Cl.
CPC ... *H01M 10/0436* (2013.01); *H01M 10/0525* (2013.01); *H01M 10/0562* (2013.01); *H01M 10/0585* (2013.01); *H01M 4/525* (2013.01); *H01M 2220/30* (2013.01); *H01M 2300/0068* (2013.01)

(58) Field of Classification Search
None
See application file for complete search history.

(56) References Cited

U.S. PATENT DOCUMENTS 5,939,217 A   8/1999  Tamura et al.
5,994,834 A   11/1999 Alwan et al.
(Continued)

FOREIGN PATENT DOCUMENTS

CN   103178302 A    6/2013
DE   102011085863 A1  5/2013
(Continued)

OTHER PUBLICATIONS

Banerjee et al., "Fabrication of piezodriven, free-standing, all-oxide heteroepitaxial cantilevers on silicon" APL Materials 2, 096103 (2014) (Year: 2014).*
(Continued)

*Primary Examiner* — Alix E Eggerding
(74) *Attorney, Agent, or Firm* — Scully, Scott, Murphy & Presser, P.C.; L. Jeffrey Kelly, Esq.

(57) ABSTRACT

A method of forming an all solid-state thin-film battery that can be scaled down and be integrated into a CMOS process is provided. The method includes a lift-off process in which battery material layers formed upon a patterned sacrificial material are removed from a bottom electrode, while battery material layers that are formed directly on a surface of the bottom electrode remain after performing the lift-off process. In some embodiments, a solid-state lithium based battery can be formed that includes a thin lithiated cathode material layer (thickness of less than 200 nm) composed of $LiCoO_2$. Such a solid-state lithium based battery exhibits enhanced battery performance in terms of charge rate and specific charge capacity.

11 Claims, 4 Drawing Sheets

(51) Int. Cl.
  *H01M 10/0562* (2010.01)
  *H01M 10/0585* (2010.01)
  *H01M 4/525* (2010.01)

(56) References Cited

U.S. PATENT DOCUMENTS

| | | | |
|---|---|---|---|
| 6,094,292 | A | 7/2000 | Goldner et al. |
| 6,495,283 | B1 | 12/2002 | Yoon et al. |
| 7,314,683 | B2 | 1/2008 | Choi et al. |
| 7,959,769 | B2 | 6/2011 | Zhang et al. |
| 7,993,773 | B2 | 8/2011 | Snyder et al. |
| 8,636,876 | B2 | 1/2014 | Zhang et al. |
| 8,790,804 | B2 | 7/2014 | Deligianni et al. |
| 2001/0032666 | A1 | 10/2001 | Jenson et al. |
| 2002/0071983 | A1* | 6/2002 | Rowen .............. B24C 1/04 429/535 |
| 2002/0092558 | A1 | 7/2002 | Kim et al. |
| 2004/0058237 | A1* | 3/2004 | Higuchi .............. H01M 6/188 429/209 |
| 2004/0234847 | A1* | 11/2004 | Mino .............. H01M 2/0202 429/175 |
| 2004/0258984 | A1 | 12/2004 | Ariel et al. |
| 2005/0130078 | A1* | 6/2005 | Bedell .............. C09D 125/18 430/324 |
| 2008/0057397 | A1 | 3/2008 | Skotheim et al. |
| 2009/0246636 | A1 | 10/2009 | Chiang et al. |
| 2010/0285372 | A1 | 11/2010 | Lee et al. |
| 2011/0076542 | A1 | 3/2011 | Farmer |
| 2011/0095720 | A1 | 4/2011 | Shacklette et al. |
| 2011/0281160 | A1 | 11/2011 | Doi |
| 2011/0294015 | A1 | 12/2011 | Pirk et al. |
| 2013/0089769 | A1 | 4/2013 | Proctor et al. |
| 2013/0095381 | A1 | 4/2013 | Oukassi et al. |
| 2013/0130066 | A1 | 5/2013 | Pytlik et al. |
| 2013/0149593 | A1 | 6/2013 | Hayashi et al. |
| 2013/0164459 | A1* | 6/2013 | Nieh .............. H01J 37/3426 427/580 |
| 2013/0260183 | A1 | 10/2013 | Ellis-Monaghan et al. |
| 2015/0084157 | A1 | 3/2015 | Tegen et al. |
| 2015/0280198 | A1 | 10/2015 | Weis et al. |
| 2016/0211547 | A1* | 7/2016 | Hwang .............. H01M 4/131 |
| 2017/0162854 | A1 | 6/2017 | Sugiura |
| 2018/0123181 | A1* | 5/2018 | Son .............. H01M 10/052 |

FOREIGN PATENT DOCUMENTS

| | | | |
|---|---|---|---|
| JP | 2007103130 | A | 4/2007 |
| JP | 201526555 | A | 2/2015 |
| WO | 2017105234 | A1 | 6/2017 |

OTHER PUBLICATIONS

Carmo, J. P., et al., "Integrated thin-film rechargeable battery in a thermoelectric scavenging microsystem", POWERENG, Mar. 18-20, 2009, p. 359-362, Lisbon, Portugal.

Boyle, R., "Tiny Battery Embedded in a Nanowire is the Smallest Battery Yet", Popular Science, Jul. 29, 2011, 2 pages.

Chung, J., et al., "Pulsed laser deposited LiNi0.5Mn0.5O2 thin films on the Pt(200)/TiO2/SiO2/Si substrates for lithium-ion battery application", IEEE, Nanotechnology Materials and Devices Conference, Date of Conference: Oct. 22-25, 2006, NMDC, pp. 640-641.

Matsumoto, H., et al., "Fast cycling of Li/LiCoO2 cell with low-viscosity ionic liquids based on bis(fluorosulfonyl) imide [FSI]-", Journal of Power Sources 160, Available online Mar. 22, 2006, pp. 1308-1313.

Jo, M., et al., "Effect of LiCoO2 Cathode Nanoparticle Size on High Rate Performance for Li-Ion Batteries", Journal of The Electrochemical Society, Published Apr. 6, 2009, pp. A430-A434, 156, 6.

Office Action dated Oct. 5, 2018 received in U.S. Appl. No. 15/818,405.

Office Action dated Oct. 5, 2018 received in U.S. Appl. No. 15/818,385.

List of IBM Patents or Patent Applications Treated as Related, dated Nov. 27, 2017, 2 pages.

Office Action dated Feb. 8, 2019 received in U.S. Appl. No. 15/481,042.

Office Action dated Feb. 26, 2019 received in U.S. Appl. No. 15/818,385.

Office Action dated Feb. 28, 2019 received in U.S. Appl. No. 15/818,405.

"Fuse", Merriam-Webster.com, Web, Aug. 9, 2018, 1 page.

Office Action dated Aug. 16, 2018 received in a related U.S. Patent Application, namely U.S. Appl. No. 15/481,042.

Advisory Action dated Apr. 16, 2019 received in U.S. Appl. No. 15/481,042.

Office Action dated May 16, 2019 received in U.S. Appl. No. 15/818,286.

Office Action dated May 16, 2019 received in U.S. Appl. No. 15/818,350.

Office Action dated Jun. 11, 2019 received in U.S. Appl. No. 15/481,042.

Office Action dated Jun. 5, 2019 received in U.S. Appl. No. 15/818,405.

Office Action dated Jul. 10, 2019 received in U.S. Appl. No. 15/818,385.

Office Action dated Aug. 22, 2019 received in U.S. Appl. No. 15/822,301.

* cited by examiner

FABRICATION METHOD OF ALL SOLID-STATE THIN-FILM BATTERY

BACKGROUND

The present application relates to an all solid-state thin film battery and a method of forming the same. More particularly, the present application relates to a method of forming an all solid-state thin film battery and a solid-state lithium-based battery having enhanced performance. The method can be used to fabricate micrometer scale sized batteries.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Furthermore, it is also useful to scale the battery device size down to the micron level to integrate the batteries into small scale devices such as, microprocessors, sensors, or IoT (internet of things) systems. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based thin-film battery. Lithium-based thin-film batteries are storage batteries that include two electrodes implementing lithium. Such lithium-based thin-film batteries are typically patterned utilizing photolithography and etching.

There is a need for providing a method of forming lithium-based thin-film batteries, and other types of all solid-state thin-film batteries, that avoids utilizing liquid-containing materials such as conventional liquid-based electrolytes to form the battery material stack. Moreover, there is a need for providing a method of forming a solid-state thin film battery that is compatible with existing CMOS (complementary metal oxide semiconductor) processes and which can be monolithically integrated to other microelectronic devices. Also, there is a need for providing a lithium-based thin-film battery that has improved device performance at fast charging speeds.

SUMMARY

A method of forming an all solid-state thin-film battery that can be scaled down and be integrated into a CMOS process is provided. The term "thin-film battery" is used throughout the present application to denote a battery whose thickness is 100 μm or less. The term "all solid-state" denotes a battery that is entirely composed of solid materials. The method includes a lift-off process in which a battery material stack formed upon a patterned sacrificial material is removed from a bottom electrode, while a battery material stack that is formed directly on a surface of the bottom electrode remains after performing the lift-off process. In some embodiments, a solid-state lithium based battery can be formed that includes a thin lithiated cathode material layer (thickness of less than 200 nm) composed of $LiCoO_2$. Such a solid-state lithium based battery exhibits enhanced battery performance in terms of charge rate and specific charge capacity.

One aspect of the present application relates to a non-photolithographic method of forming an all solid-state thin-film battery. In one embodiment, the method includes forming a patterned sacrificial material on a surface of a bottom electrode, wherein the patterned sacrificial material contains an opening that physically exposes a portion of the surface of the bottom electrode. Next, an all solid-state battery stack such as, for example, a solid-state lithium-based battery stack, is formed on the patterned sacrificial material and on the physically exposed portion of the bottom electrode in the opening. A lift-off process is then performed to remove the patterned sacrificial material and the all solid-state battery stack formed on the patterned sacrificial material from the bottom electrode, while maintaining the all solid-state battery stack on the physically exposed portion of the surface of the bottom electrode.

Another aspect of the present application relates to a solid-state lithium battery that has enhanced battery performance. In one embodiment, the solid-state lithium based battery includes a bottom electrode, a lithiated cathode material layer on the bottom electrode, wherein the lithiated cathode material layer comprises $LiCoO_2$ and has a thickness of less than 200 nm, a lithium-based solid-state electrolyte layer located on the lithiated cathode material layer, and a top electrode located above the lithium-based solid-state electrolyte layer. Such a solid-state lithium based battery may have a charge rate of greater than 10 C (wherein C is the total charge capacity per hour), and a specific charge capacity of greater than 100 mAh/g.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 1:
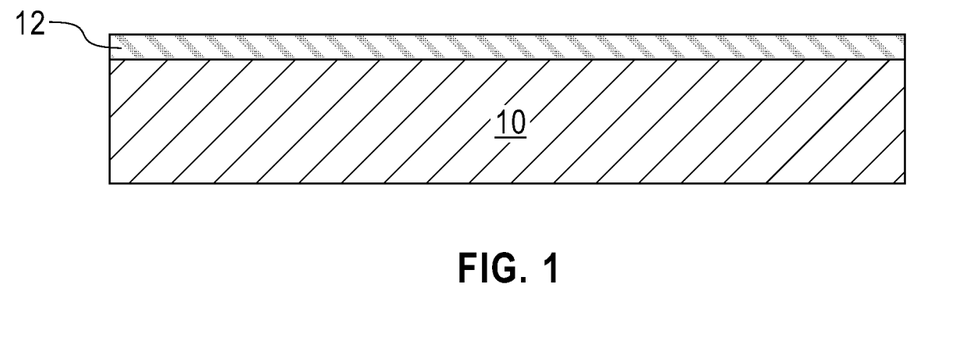
FIG. 1 is a cross sectional view of an exemplary structure including a bottom electrode located on a surface of a substrate that can be employed in accordance with an embodiment of the present application.

Referring first to FIG. 1, there is illustrated an exemplary structure that can be employed in accordance with an embodiment of the present application. The exemplary structure of FIG. 1 includes a bottom electrode 12 located on a surface of a substrate 10. As is shown, the bottom electrode 12 is typically a continuous layer (without any intentionally formed gaps or breaks) that is present on an entirety of the substrate 10.

The substrate 10 that can be employed in the present application includes any conventional material that is used as a substrate for a solid-state lithium-based battery. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In another embodiment, the substrate 10 is a metallic material such as, for example, aluminum (Al), aluminum alloy, titanium (Ti), tantalum (Ta), tungsten (W), or molybdenum (Mo).

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 µm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 µm root mean square as also measured by profilometry. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the substrate is composed of a plurality of pyramids. In yet another embodiment, the textured surface of the substrate is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the substrate occurs.

The bottom electrode 12 may include any metallic electrode material such as, for example, titanium (Ti), platinum (Pt), nickel (Ni), aluminum (Al) or titanium nitride (TiN). In one example, the bottom electrode 12 includes a stack of, from bottom to top, titanium (Ti), platinum (Pt) and titanium (Ti). The bottom electrode 12 may be formed utilizing a deposition process including, for example, chemical vapor deposition (CVD), plasma enhanced chemical vapor deposition (PECVD), evaporation, sputtering, or plating. The bottom electrode 12 may have a thickness from 10 nm to 500 nm. Other thicknesses that are lesser than, or greater than, the aforementioned thickness values may also be used for the bottom electrode 12.

Figure 2:
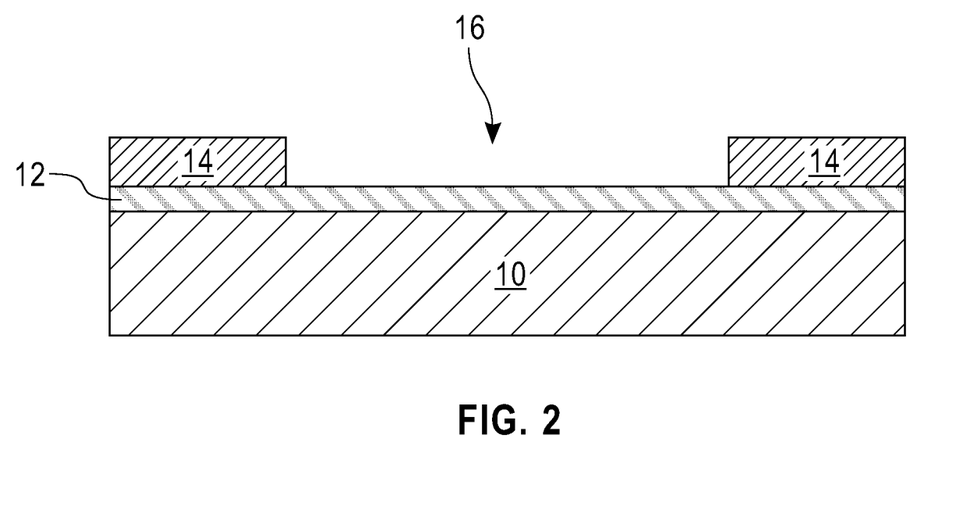
FIG. 2 is a cross sectional view of the exemplary structure of FIG. 1 after forming a patterned sacrificial material on a surface of the bottom electrode, wherein the patterned sacrificial material includes an opening that physically exposes a portion of the surface of the bottom electrode.

Referring now to FIG. 2, there is illustrated the exemplary structure of FIG. 1 after forming a patterned sacrificial material 14 on the surface of the bottom electrode 12, wherein the patterned sacrificial material 14 includes an opening 16 that physically exposes a portion of the surface of the bottom electrode 12. The opening 16 defines an area in which an all solid-state thin-film battery will be subsequently formed. Although the present application describes and illustrates a single opening 16, a plurality of openings 16 can be formed in which each opening of the plurality of openings 16 can define an area for subsequent formation of an all solid-state thin-film battery.

The patterned sacrificial material 14 can be formed by first applying a sacrificial material (not shown) to the physically exposed surface of the bottom electrode 12. In one embodiment, the sacrificial material is a photoresist material. In such an embodiment, the photoresist material may be a positive-tone photoresist material, a negative-tone photoresist material or a hybrid-tone photoresist material. The sacrificial material may be formed utilizing a deposition process such as, for example, spin-on coating or blade coating, followed by a bake step to evaporate any residual solvent(s). The sacrificial material may have a thickness from 100 nm to 20 µm. Other thicknesses that are lesser than, or greater than, the aforementioned thickness values may also be used for the sacrificial material.

The deposited sacrificial material is then patterned. In one embodiment and when the sacrificial material is a photoresist material, the photoresist material may be patterned by exposing the photoresist material to a desired pattern of radiation, and thereafter the exposed photoresist material is developed utilizing a conventional resist developer to provide a patterned sacrificial material 14. When non-photoresist sacrificial materials are used, the non-photoresist sacrificial materials can be patterned by lithography and etching.

In another embodiment, the sacrificial material that provides the patterned sacrificial material 14 is a shadow mask. In such an embodiment, the shadow mask may be a pre-patterned metallic material or a pre-patterned polymeric material. The pre-patterned shadow mask material is attached to the structure shown in FIG. 1 by mechanical force or a removable adhesive.

Figure 3A:
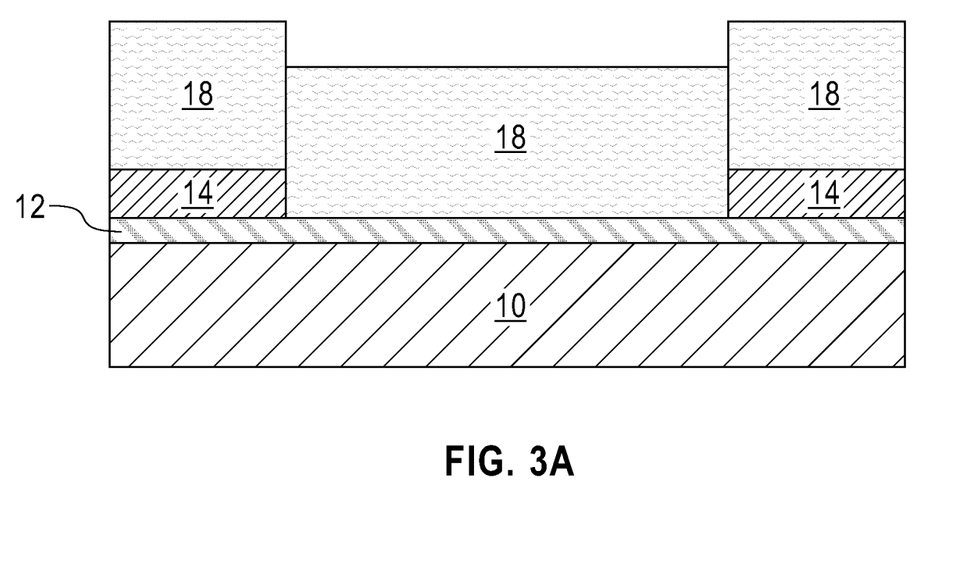
FIG. 3A is a cross sectional view of the exemplary structure of FIG. 2 after forming an all solid-state battery stack on the patterned sacrificial material and on the physically exposed portion of the bottom electrode in the opening.

Referring now to FIG. 3A, there is illustrated of the exemplary structure of FIG. 2 after forming an all solid-state battery stack 18 on the patterned sacrificial material 14 and on the physically exposed portion of the bottom electrode 12 in the opening 16. The all solid-state battery stack 18 can be formed utilizing various deposition techniques well known to those skilled in the art. Also, the all solid-state battery stack 18 includes conventional materials that are also well known to those skilled in the art. For example, the all solid-state battery stack 18 comprises, from bottom to top, a cathode layer, a solid-state electrolyte layer and a top electrode. In some embodiments, the solid-state battery stack 18 may further comprise an anode region located between the solid-state electrolyte layer and the top electrode. The anode region may or may not be continuously present between the solid-state electrolyte layer and the top electrode. The anode region may be a deposited anode material, or it may be generated during a charging/recharging process. In a further embodiment, the solid-state battery stack may even further comprise a liner located between the solid-state electrolyte layer and the anode region.

Figure 3B:
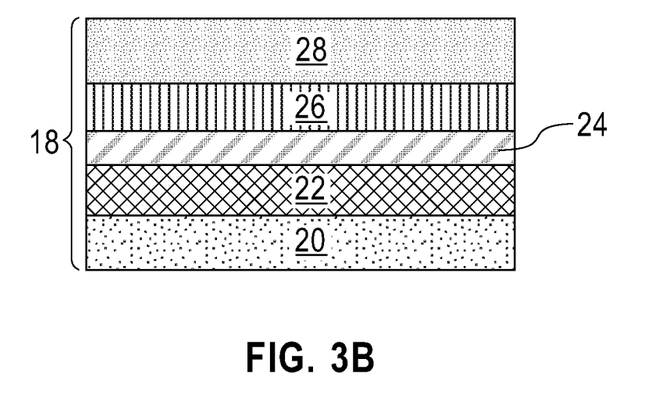
FIG. 3B is a cross sectional view of an exemplary all solid-state battery stack that can be employed in the present application.

An exemplary all solid-state battery stack 18 that can be employed in the present application is shown in FIG. 3B. Notably, the all solid-state battery stack 18 shown in FIG. 3B is a solid-state lithium-based battery stack. Although a solid-state lithium-based battery stack is exemplified herein as the all solid-state battery stack 18, other types of all solid-state battery stacks can be employed in the present application. The all solid-state battery stack 18 shown in FIG. 3B includes, from bottom to top, a cathode layer 20, a solid-state electrolyte layer 22, an optional liner 24, an anode region 26 and a top electrode 28. As stated above, the anode region 26 may be a deposited anode material, or it may be generated during a charging/recharging process.

The cathode layer 20 of the lithium-based battery stack may include a lithiated material such as, for example, a lithium-based mixed oxide. Hence, the cathode layer 20 of the lithium-based battery stack may be referred to as a lithiated cathode material layer. Examples of lithium-based mixed oxides that may be employed as the cathode layer 20 of the lithium-based battery stack include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$) or lithium iron phosphate ($LiFePO_4$).

The cathode layer 20 of the lithium-based battery stack may be formed utilizing a deposition process such as, sputtering or plating. In one embodiment, the cathode layer 20 of the lithium-based battery stack is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The cathode layer 20 of the lithium-based battery stack may have a thickness from 10 nm to 20 µm. Other thicknesses that are lesser than, or greater than, the aforementioned thickness values may also be used for cathode layer 20 of the lithium-based battery stack.

The solid-state electrolyte layer 22 of the lithium-based battery stack includes a material that enables the conduction of lithium ions; the solid-state electrolyte layer 22 of the lithium-based battery stack may be referred to as a lithium-based solid-state electrolyte layer. Such materials may be electrically insulating or ionic conducting. Examples of materials that can be employed as the solid-state electrolyte layer 22 of the lithium-based battery stack include, but are not limited to, lithium phosphorus oxynitride (LiPON) or lithium phosphosilicate oxynitride (LiSiPON).

The solid-state electrolyte layer 22 of the lithium-based battery stack may be formed utilizing a deposition process such as, sputtering or plating. In one embodiment, the solid-state electrolyte layer 22 of the lithium-based battery stack is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The solid-state electrolyte layer 22 of the lithium-based battery stack may have a thickness from 10 nm to 10 µm. Other thicknesses that are lesser than, or greater than, the aforementioned thickness values may also be used for the solid-state electrolyte layer 22 of the lithium-based battery stack.

The liner 24 that may be present in the lithium-based battery stack is a continuous layer that covers the entirety of the solid-state electrolyte layer 22. In one embodiment, the liner 24 that may be present in the lithium-based battery stack shown in FIG. 3B is a lithium nucleation enhancement liner. In such an embodiment, the lithium nucleation enhancement liner includes a material that can facilitate the subsequent nucleation of lithium upon performing a charging/recharging process. In one embodiment, lithium nucleation enhancement liner that can be used as liner 24 is composed of gold (Au), silver (Ag), zinc (Zn), magnesium (Mg), tantalum (Ta), tungsten (W), molybdenum (Mo), a titanium-zirconium-molybdenum alloy (TZM), or silicon (Si). In another embodiment, liner 24 is a barrier material such as, for example, LiF.

The liner 24 can be formed utilizing a deposition process. Examples of deposition processes than can be used in forming the liner 24 include chemical vapor deposition (CVD), plasma enhanced chemical vapor deposition (PECVD), evaporation, sputtering or plating. The liner 24 typically has a thickness that is greater than 1 nm. In one embodiment, the liner 24 has a thickness from 2 nm to 20 nm.

The anode region 26 of the lithium-based battery stack includes any material that is a lithium ion generator or lithium intercalation active material. Examples of materials that may be used as anode region 26 include, but are not limited to, lithium metal, a lithium-base alloy such as, for example, $Li_xSi$, or a lithium-based mixed oxide such as, for example, lithium titanium oxide ($Li_2TiO_3$). The anode region 26 may be a continuous layer or it may be composed of a plurality of non-continuous islands.

In some embodiments, the anode region 26 is formed prior to performing a charging/recharging process. In such an embodiment, the anode region 26 can be formed utilizing a deposition processes such as, for example, chemical vapor deposition (CVD), plasma enhanced chemical vapor deposition (PECVD), evaporation, sputtering or plating. In other embodiments, the anode region 26 is a lithium accumulation region that is formed during a charging/recharging process.

The top electrode 28 of the lithium-based battery stack may include any metallic electrode material such as, for example, titanium (Ti), platinum (Pt), nickel (Ni), copper (Cu) or titanium nitride (TiN). In one example, the top electrode 26 includes a stack of, from bottom to top, nickel (Ni) and copper (Cu). In one embodiment, the metallic electrode material that provides the top electrode 28 may be the same as the metallic electrode material that provides the bottom electrode 12. In another embodiment, the metallic electrode material that provides the top electrode 28 may be different from the metallic electrode material that provides the bottom electrode 12. The top electrode 28 may be formed utilizing one of the deposition processes mentioned above for forming the bottom electrode 12. The top electrode 28 may have a thickness within the range mentioned above for the bottom electrode 12.

Figure 4:
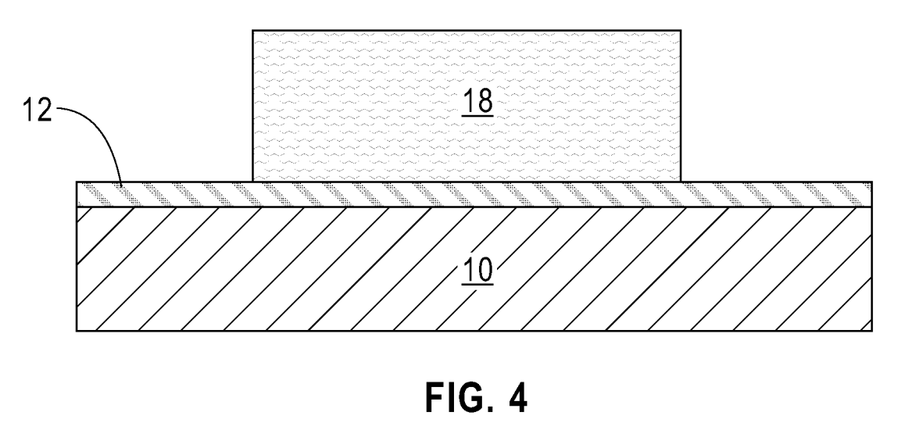
FIG. 4 is a cross sectional view of the exemplary structure of FIG. 3A after performing a lift-off process in which the patterned sacrificial material and the all solid-state battery stack formed thereon are removed from the bottom electrode, while maintaining the all solid-state battery stack on the bottom electrode.

Referring now to FIG. 4, there is illustrated the exemplary structure of FIG. 3A after performing a lift-off process in which the patterned sacrificial material 14 and all materials (i.e., battery material stack) formed thereon are removed from the bottom electrode 12, while maintaining the battery material stack 18 on the bottom electrode 12. In one embodiment, the lift-off process includes removing the patterned sacrificial material 14 utilizing a solvent or etchant that is selective for removing the sacrificial material. In one example, the solvent is a non-aqueous solvent such as, for example, acetone.

In another embodiment, the removing does not include the use of a solvent, but instead, the mechanical force is released or release occurs by peeling the patterned sacrificial material 14 from the removable adhesive. When patterned sacrificial material 14 is removed, the materials on the top of the patterned sacrificial material 14 are also removed from the structure. The material stack, i.e., the battery stack material stack 18, that is present on the surface of the bottom electrode 12 remains. The various material layers of the battery stack material stack 18 that remains on the surface of the bottom electrode have sidewall surfaces that are vertically aligned to each other. For example, the material layers of the lithium-based battery stack 18 shown in FIG. 3B that remain on the surface of the bottom electrode have sidewall surfaces that are vertically aligned to each other.

Figure 5:
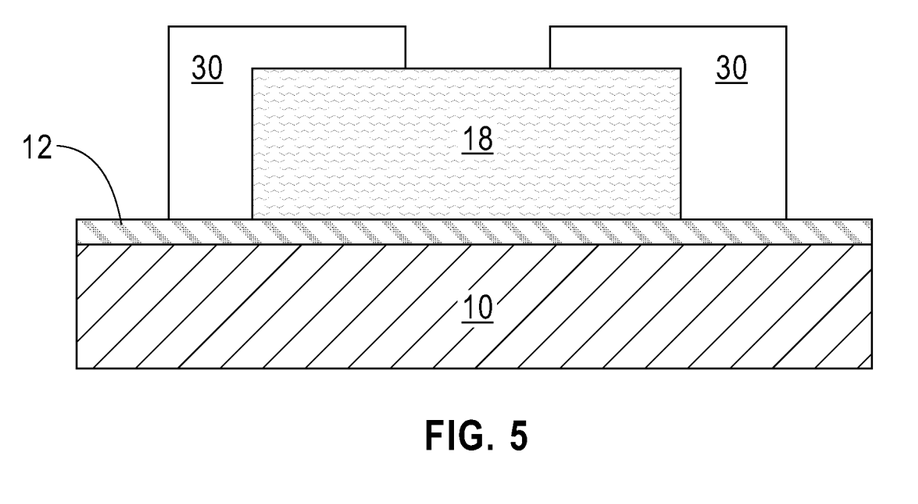
FIG. 5 is a cross sectional view of the exemplary structure of FIG. 4 after forming an air and/or moisture impermeable structure.

Referring now to FIG. 5, there is illustrated the exemplary structure of FIG. 4 after forming an air and/or moisture impermeable structure. The air and/or moisture impermeable structure 30 includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure 30 may be formed by first depositing the air and/or moisture impermeable material and thereafter patterning the air and/or moisture impermeable material. In one embodiment, patterning may be performed by lithography and etching. The air and/or moisture impermeable structure 30 is located surrounding at least the sidewall surfaces of the battery material stack 18.

The all solid-state battery of the present application may be charged/recharged utilizing conventional techniques well known to those skilled in the art. For example, the all solid-state battery can be charged/recharged by connecting the all solid-state to an external power supply. In some embodiments and for solid-state lithium based batteries, the battery may have a fast charge rate C, wherein C is the total charge capacity/hr. By "fast charge rate C" it is meant a charge rate of 3 C or greater.

Figure 6A:
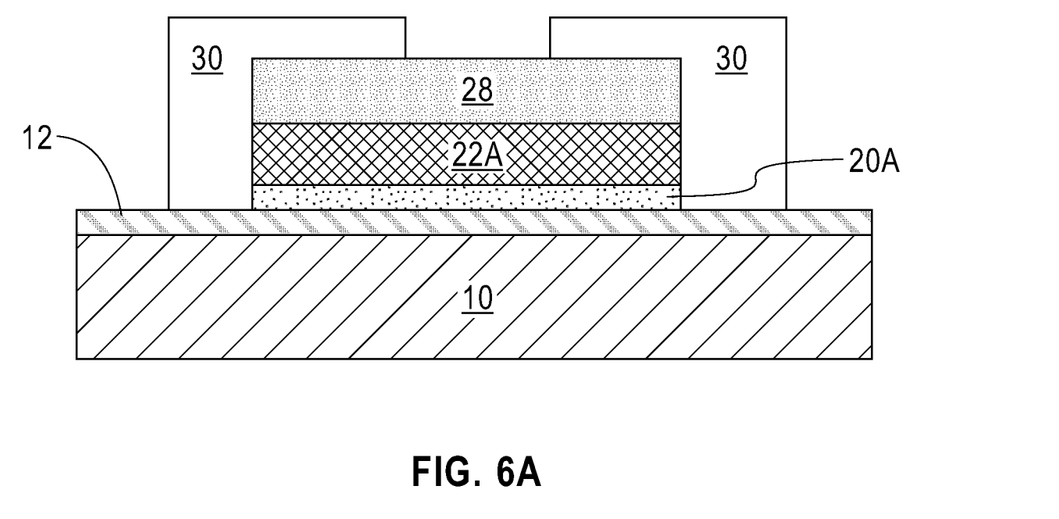
FIGS. 6A and 6B are cross sectional views of an all solid-state lithium-based battery of the present application prior to and after charging, respectively.
Figure 6B:
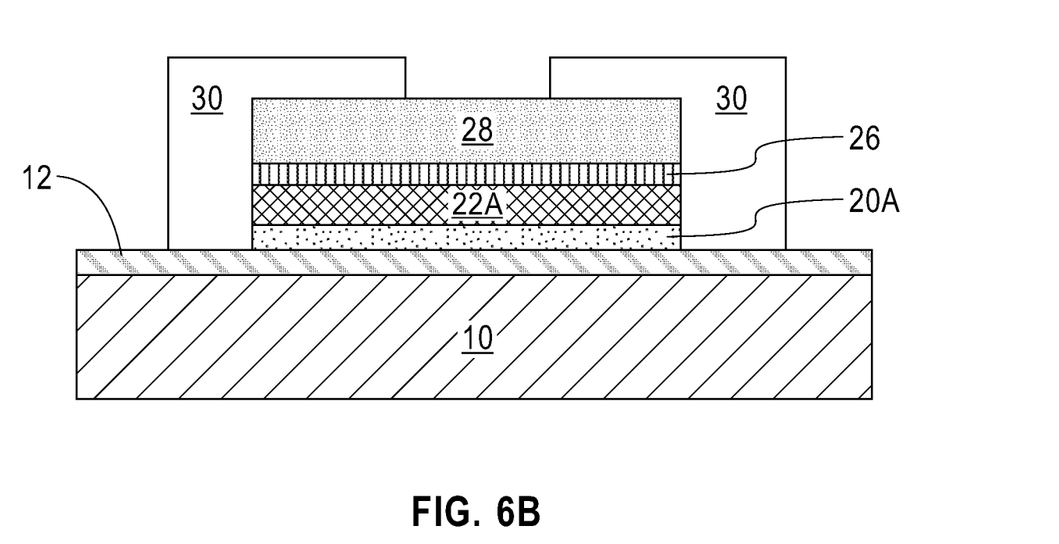

Referring now to FIGS. 6A and 6B, there are illustrated a solid-state lithium-based battery of the present application prior to and after charging, respectively. Each of the solid-state lithium-based batteries shown in FIGS. 6A and 6B includes substrate 10 (as defined above), bottom electrode 12 (as defined above), cathode layer 20A (i.e., a lithiated cathode material layer) of $LiCoO_2$ that has a thickness of less than 200 nm, a lithium-based solid-state electrolyte layer 22A, and a top electrode 28 (as defined above). A typically thickness range for the $LiCoO_2$ cathode is from 40 nm to 90 nm. In this embodiment of the present application, the thickness of the lithiated cathode material layer is typically less than 200 nm, with a range from 50 nm to 150 nm being more typical for the lithiated cathode material layer.

During a charge/recharge process, anode region 26 (i.e., a lithium accumulation region) as shown in FIG. 6B forms between the top electrode 28 and the lithium-based solid-state electrolyte layer 22A. The anode region 26 may, or may not, be a continuous layer. Solid-state lithium-based batteries that contain a cathode layer 20A of $LiCoO_2$ that has a thickness of less than 200 nm exhibit enhanced battery performance in terms of charge rate and specific charge capacity. Notably, solid-state lithium-based batteries that contain a cathode layer 20A of $LiCoO_2$ that has a thickness of less than 200 nm exhibit a charge rate of greater than 10 C, and a specific charge capacity of greater than 100 mAh/g.

Figure 7:
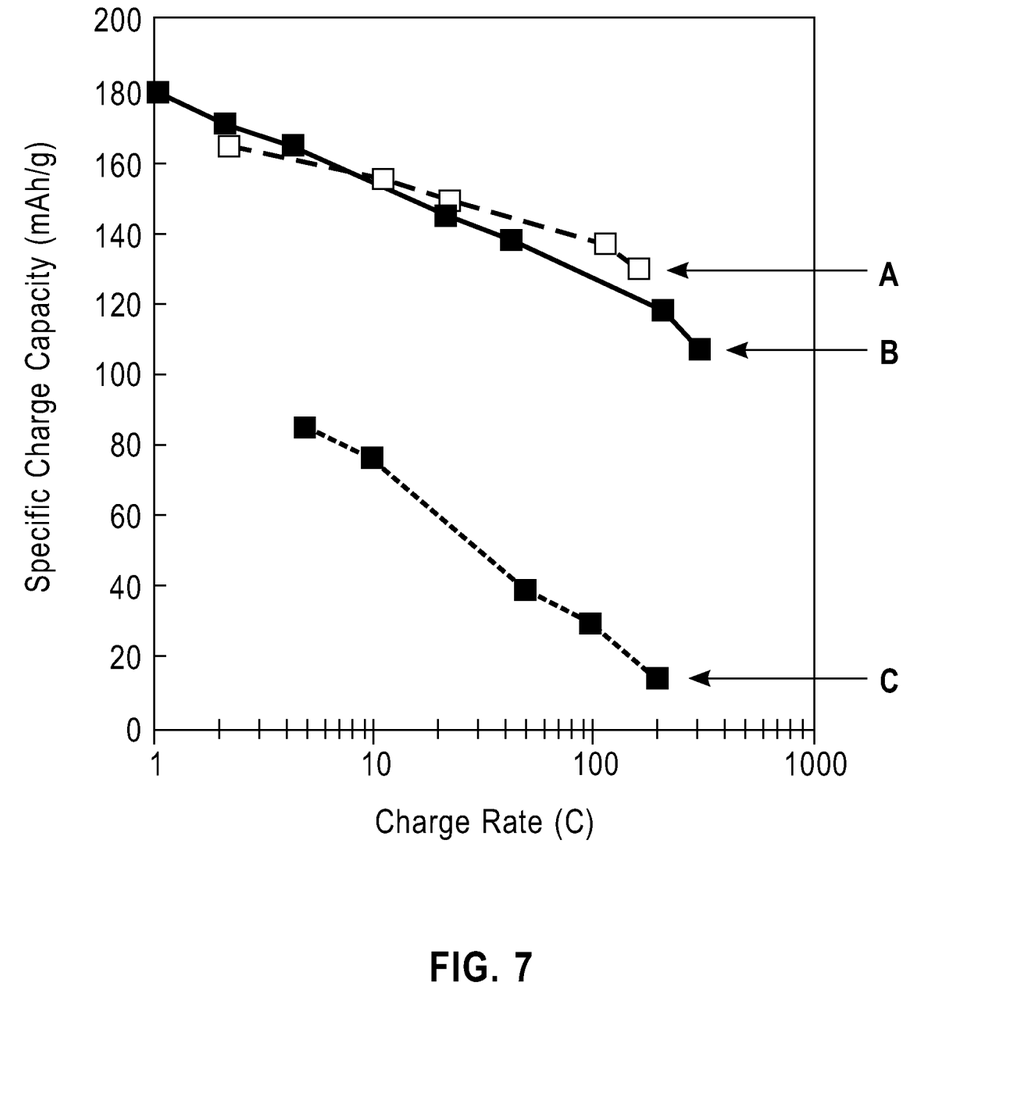
FIG. 7 is a graph of specific charge capacity (mAh/g) vs. charge rate, C, of various solid-state lithium-based batteries containing cathode layers having different thicknesses.

Referring now to FIG. 7, there is a graph of specific charge capacity (mAh/g) vs. charge rate, C, of various solid-state lithium-based batteries containing cathode layers having different thicknesses. Notably, "A" represents a state lithium-based battery as shown in FIG. 6A including a bottom electrode of Ti/Pt/Ti (5 nm/50 nm/5 nm), a lithiated cathode material layer of $LiCoO_2$ that has a thickness of 45 nm, a lithium-based solid-state electrolyte layer composed of LiPON having a thickness of 80 nm, and a top electrode of Ni/Cu (50 nm/50 nm), "B" represents another state lithium-based battery as shown in FIG. 6A including a bottom electrode of Ti/Pt/Ti (5 nm/50 nm/5 nm), a lithiated cathode material layer of $LiCoO_2$ that has a thickness of 85 nm, a lithium-based solid-state electrolyte layer composed of LiPON having a thickness of 80 nm, and a top electrode of Ni/Cu (50 nm/50 nm), and "C" represents a comparative state lithium-based battery including a bottom electrode of Ti/Pt/Ti (5 nm/50 nm/5 nm), a lithiated cathode material layer of $LiCoO_2$ that has a thickness of 210 nm, a lithium-based solid-state electrolyte layer composed of LiPON having a thickness of 80 nm, and a top electrode of Ni/Cu (50 nm/50 nm). As can be seen in FIG. 7, batteries A and B that contain a thin layer of $LiCoO_2$ (less than 200 nm) as the cathode layer have a charge rate of greater than 10 C, and a specific charge capacity of greater than 100 mAh/g, while battery C exhibited a lower specific charge capacity than either batter A or battery B.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A method of forming an all solid-state thin-film battery, the method comprising:
    forming a patterned sacrificial material directly on a surface of a bottom electrode, wherein the patterned sacrificial material consists of a pre-patterned metallic material that is applied directly to the surface of the bottom electrode by a mechanical force and contains an opening that physically exposes a portion of the surface of the bottom electrode;
    forming an all solid-state battery stack on an entirety of a sidewall and a topmost surface of the patterned sacrificial material and on the physically exposed portion of the bottom electrode in the opening; and
    performing a lift-off process to remove the patterned sacrificial material and the all solid-state battery stack formed on the topmost surface of the patterned sacrificial material from the bottom electrode, while maintaining the all solid-state battery stack on the physically exposed portion of the surface of the bottom electrode, wherein the lift-off process comprises releasing the mechanical force.

2. The method of claim 1, further comprising forming an air and/or moisture impermeable structure on physically exposed surfaces of the bottom electrode and surrounding the all solid-state battery stack that remains on the surface of the bottom electrode.

3. The method of claim 1, wherein the all solid-state battery stack comprises, from bottom to top, a cathode layer, a solid-state electrolyte layer and a top electrode.

4. The method of claim 3, wherein the all solid-state battery stack further comprises an anode region located between solid-state electrolyte layer and the top electrode.

5. The method of claim 4, wherein the all solid-state battery stack further comprises a liner located between the solid-state electrolyte layer and the anode region.

6. The method of claim 3, wherein the all solid-state battery stack is a solid-state lithium based battery stack, the cathode layer is composed of a lithiated cathode material, and the solid-state electrolyte layer is composed of a lithium-based solid-state electrolyte.

7. The method of claim 6, wherein the all solid-state battery stack further comprises an anode region located between solid-state electrolyte layer and the top electrode, wherein the anode region comprises a lithium ion generator or lithium intercalation active material.

8. The method of claim 7, wherein the all solid-state battery stack further comprises a liner located between the solid-state electrolyte layer and the anode region, wherein the liner comprises a nucleation enhancement liner.

9. The method of claim 1, wherein the bottom electrode is formed on a textured surface of a substrate prior to forming the patterned sacrificial material on the bottom electrode.

10. The method of claim 1, wherein the bottom electrode is formed on a non-textured surface of a substrate prior to forming the patterned sacrificial material on the bottom electrode.

11. A method of forming an all solid-state thin-film battery, the method comprising:
    forming a patterned sacrificial material on a surface of a bottom electrode, wherein the patterned sacrificial material consists of pre-patterned metallic material that is applied to the surface of the bottom electrode by an adhesive and contains an opening that physically exposes a portion of the surface of the bottom electrode;
    forming an all solid-state battery stack on an entirety of a sidewall and a topmost surface of the patterned sacrificial material and on the physically exposed portion of the bottom electrode in the opening; and
    performing a lift-off process to remove the patterned sacrificial material and the all solid-state battery stack formed on the patterned sacrificial material from the bottom electrode, while maintaining the all solid-state battery stack on the physically exposed portion of the surface of the bottom electrode, wherein the lift-off process comprises peeling the patterned sacrificial material from the adhesive.

\* \* \* \* \*